Figure 1:
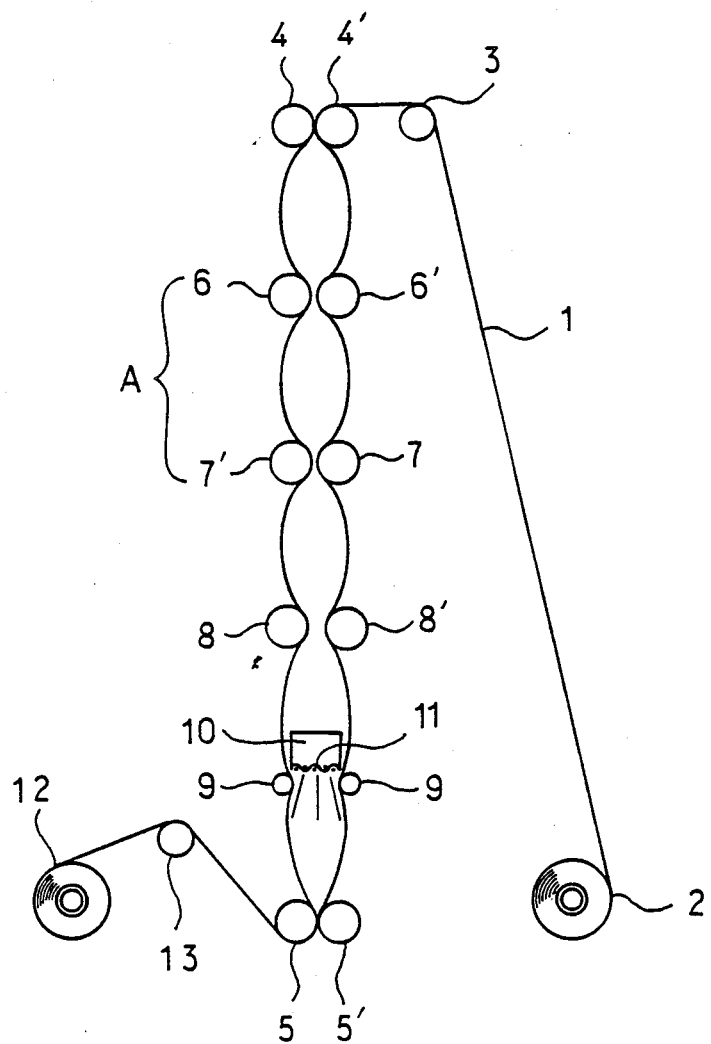

United States Patent [19]
Sugimoto et al.

[11] Patent Number: 4,888,223
[45] Date of Patent: Dec. 19, 1989

[54] FOOD-PACKAGING MATERIAL AND PROCESS FOR PREPARING THE SAME

[76] Inventors: Noritsugu Sugimoto, 4190-banchi, Zama, Zama-shi, Kanagawa-ken; Nobuyuki Mori, 9, 315-banchi, Kitayana, Hatano-shi, Kanagawa-ken; Shozi Nakamura, 1, 221-banchi, Ooaza-Awaji, Chuzu-cho, Yasu-gun, Shiga-ken; Fusazo Wada, c/o Danshi-Roy of Gunze Limited, 163-banchi, Morikawara-cho, Moriyama-shi, Shiga-ken, all of Japan

[21] Appl. No.: 190,445

[22] Filed: May 5, 1988

[30] Foreign Application Priority Data

May 21, 1987 [JP] Japan .................. 62-122459
Apr. 6, 1988 [JP] Japan .................. 63-85722

[51] Int. Cl.⁴ .................. B65D 85/00; B32B 27/08; B29C 71/04
[52] U.S. Cl. .................. 428/34.9; 264/22; 264/563; 426/129; 428/35.4; 428/475.8; 428/476.3; 428/516
[58] Field of Search .......... 426/129; 428/516, 476.3, 428/476.9, 476.1, 475.8, 910, 35.2, 35.4, 34.9; 264/22, 563

[56] References Cited

U.S. PATENT DOCUMENTS

| | | | |
|---|---|---|---|
| 4,286,746 | 9/1981 | Gorshe | 383/119 |
| 4,560,614 | 12/1985 | Park | 428/516 |
| 4,606,922 | 8/1986 | Schirmer | 426/129 |
| 4,652,490 | 3/1987 | Arita | 428/516 |
| 4,746,562 | 5/1988 | Fant | 428/516 |

FOREIGN PATENT DOCUMENTS

| | | |
|---|---|---|
| 1350290 | 4/1974 | United Kingdom . |
| 20177625 | 4/1986 | European Pat. Off. . |
| 20189066 | 7/1986 | European Pat. Off. . |
| 1137520 | 12/1968 | United Kingdom . |
| 1269912 | 4/1972 | United Kingdom . |
| 1384352 | 2/1975 | United Kingdom . |
| 1399521 | 7/1975 | United Kingdom . |
| 1463671 | 2/1977 | United Kingdom . |
| 1480204 | 7/1977 | United Kingdom . |
| 2009003 | 6/1989 | United Kingdom . |

*Primary Examiner*—Ellis P. Robinson
*Assistant Examiner*—James J. Seidleck
*Attorney, Agent, or Firm*—Armstrong, Nikaido, Marmelstein, Kubovcik & Murray

[57] ABSTRACT

Disclosed is a food-packaging material comprising a heat-shrinkable, gas-barrier, multi-layer plastics film having an innermost layer of polyolefin resin to be contacted with the food to be packed, the food-packaging material being characterized in that the polyolefin resin layer has a surface treated by corona discharge.

10 Claims, 2 Drawing Sheets

FOOD-PACKAGING MATERIAL AND PROCESS FOR PREPARING THE SAME

This invention relates to a plastics film packaging material for enclosing food therein and a process for preparing the same, and more particularly to a food-packaging material which is a heat-shrinkable, gas-barrier, multi-layer plastics film having an innermost layer of polyolefin resin to be contacted with food to be wrapped, and a process for preparing the same.

Heretofore known are a wide variety of heat-shrinkable, gas-barrier, multi-layer plastics films useful as packaging materials for processed meat or like food. Among them is a heat-shrinkable, gas-barrier, multi-layer plastics film with an innermost layer of polyolefin resin for contact with the food to be packed.

Although extensively used, conventional multi-layer plastics films having an innermost polyolefin resin layer have drawbacks. Since this resin layer is poor in the property of attaining close contact with the food, particularly ham, sausage or like processed meat, a gap is formed between the processed meat and the packaging material on heat-shrink packaging or after a time interval, followed by release of gravy or water from the processed meat into the gap. In that case, bacteria easily to proliferate in the accumulated gravy or water, and proliferation of bacteria renders less preservable the processed meat enclosed in the packaging material.

An object of the present invention is to provide a food-packaging material which can overcome the foregoing problems of conventional multi-layer plastics film having an innermost polyolefin resin layer for contact with food to be packed and which is outstanding in the property of attaining close contact with the food, hence excellent in the property of preserving food.

Another object of the invention is to provide a food-packaging material which is free of blocking despite the improved property of achieving close contact with the food to be wrapped.

A further object of the invention is to provide processes for preparing said food-packaging materials.

In a food-packaging material comprising a heat-shrinkable, gas-barrier, multi-layer plastics film having an innermost layer of polyolefin resin to be contacted with the food to be packed, the food-packaging material of the present invention is characterized in that the polyolefin resin layer has a surface treated by corona discharge. The food-packaging material of the invention is further characterized in that the corona-discharged surface of the polyolefin resin layer has a blocking inhibitor powder incorporated therein or deposited thereon.

Our research revealed that when the innermost polyolefin resin layer surface of a food-packaging multi-layer film has been exposed to corona discharge, the polyolefin resin layer is remarkably improved in terms of the property of attaining close contact with processed meat such as ham, sausage or the like, assuring a long term, safe storage of processed meat without release of gravy or water not only on production of the film but at a time interval.

Our research further found that when the polyolefin resin layer treated with corona discharge has a blocking inhibitor incorporated therein or deposited thereon, blocking alone can be effectively inhibited without impairing the ability of the resin layer to make close contact with the processed meat.

The multi-layer plastics film of the present invention is provided with a polyolefin resin layer for contact with the food to be enclosed therein. Examples of polyolefin resins useful for the layer are homopolymers of olefins, copolymers thereof, copolymers of the olefin and other monomer copolymerizable therewith such as other vinyl monomers, modified polymers thereof and the like. Specific examples of such resins are polyethylene having a low density to high density, polypropylene, polybutene, copolymers thereof, ionomer resins, ethylene-acrylic acid copolymers, ethylene-vinyl acetate copolymers, modified polyolefin resins, etc. Typical examples of the modified polyolefin resins include modified polymers prepared by copolymerizing, e.g. graft copolymerizing, the homopolymer of the olefin or copolymer thereof with an unsaturated carboxylic acid, e.g. maleic acid, fumaric acid or the like, or a derivative thereof such as anhydride, ester or metal salt or the like. These modified polymers are usable singly or in mixture with each other or with other resin components, e.g. other polyolefin resins. Preferred examples of the polyolefin resins are low-density polyethylene, linear low-density polyethylene, ionomer resins, modified polyolefin resins, ethylene-vinyl acetate copolymers, etc. These polyolefin resins are usable singly or at least two of them can be used in mixture.

The laminated film of the present invention is composed of from 2 to 5 or more resin layers formed according to the degree of required properties such as strength or gas barrier property. Included among polyolefin resins for forming an innermost layer to be contacted with food are those having a poor gas-barrier property against oxygen or the like. When such polyolefin resin is used for formation of an innermost layer, at least one resin layer in the laminated film is formed from another resin having a gas barrier property. Exemplary of the resins having gas barrier property are nylon 6, nylon 6.6, copolymers thereof and like polyamide resins (nylon), aromatic polyamide resins, polyacrylonitrile resins, polyvinylidene chloride resins, ethylene-vinyl alcohol copolymers, etc. Examples of the resins with poor gas barrier property are the above polyolefins, copolymers thereof, copolymers thereof with vinyl acetate or acrylic acid, modified polyolefin resins, ionomer resins and like polyolefin resins, etc. Polyester resins are among those evaluated as intermediate between said two types of the resins in terms of gas barrier property.

A laminated film according to a preferred embodiment of the invention is composed of a polyolefin resin film as innermost layer to be contacted with the food and a base film having high impact resistance and high abrasion resistance as outermost layer, with or without an intermediate film interposed therebetween. A preferred example of such laminated films is a three-layer laminate having an outermost base layer, intermediate adhesive layer and innermost polyolefin resin layer. Preferable to use as the resin for the base film having the foregoing properties are nylon 6, nylon 6.6, copolymers thereof and like polyamide resins, polyester resins, polyacrylonitrile resins, etc. Of these resins, nylon 6, nylon 6.6, copolymers thereof and like polyamide resins are more preferred. When the base layer has fully satisfactory gas barrier property and the innermost polyolefin resin layer has adhesion to the outermost polyolefin resin layer, an intermediate layer need not be formed therebetween. On the other hand, when the outermost and innermost layers have little or no adhesion, an intermediate layer with adhesion to both of these layers must be present therebetween. When the base layer lacks gas barrier property or is short of required high level of gas barrier property, the requirement for gas barrier property can be met by forming an intermediate layer having the desired gas barrier property. The intermediate layer may be of one laminate ply or two or more laminate ply structure. A wide range of resins can be used for forming an intermediate layer. Examples thereof are modified polyolefin resins, ionomer resins, ethylene-ethyl acrylate resins, ethylene-acrylic acid resins, ethylene-vinyl alcohol copolymers, aromatic polyamide resins, ethylene-methacrylic acid copolymer, mixtures thereof, etc. Resins for the intermediate layer are selected from those having a high adhesion to adjoining layers. When the intermediate layer is required to have gas barrier property and strength, useful resins are selected from those having the desired degree of properties. For example, when nylon 6, nylon 6.6 or like polyamide resin having good gas barrier property and high strength is used for outermost base layer, it is possible to use as the resin for an intermediate layer modified polyolefin resin, ionomer resin, ethylene-vinyl alcohol copolymer or the like having the desirable adhesion to the innermost polyolefin resin layer and the outermost polyamide resin layer. Among them, ethylene-vinyl alcohol copolymer resin with gas barrier property and odor-preserving ability, or modified polyolefin resin is preferably used for intermediate layer. The presence of 2 or more laminate ply intermediate layer can improve the gas barrier property of laminated film or can give the characteristics required for a particular application.

Various combinations of resins are available for forming the layers constituting the laminated film of the invention. Preferred examples of the combination are given below in which the resins appear in the order of outermost layer/1 or more laminate ply intermediate layer/innermost layer. The two or more laminate ply intermediate layer is expressed in the order of lamination. The resins are represented respectively by the following alphabet or symbols.

A: Polyamide resin
B: Modified polyolefin resin
C: Polyolefin resin
D: Gas barrier resin other than polyamide resins
A/B/C, A/D/C, B/A/B, B/D/B, A/D/B, B/A/B/C, B/D/B/C, A/D/B/C, A/B/D/B, B/D/A/B, B/A/D/B, C/B/D/B/C, A/B/D/B/C, B/A/D/B/C, B/D/A/B/C, B/D1/D-2/B/C, D/A/B/C, A/B/C$_{-1}$/C$_{-2}$ The symbols C$_{-1}$ and C$_{-2}$ in the combinations are used to express different types of polyolefin resins, and the symbols D$_{-1}$ and D$_{-2}$ different types of gas barrier resins.

Also preferred are a combination in which B is replaced by an ionomer resin, and a combination in which the resin for the outermost layer is replaced by vinylidene chloride resin (D) or by the resin (D) further coated. Ethylene-vinyl alcohol copolymer (with gas barrier property) is also available as the resin (D).

The food products to be wrapped with the packaging material of the invention include, for example, processed meat such as ham, sausage, bacon and the like, processed fish flesh including boiled fish paste, etc. The packaging material of the invention is provided in the form of, e.g. casing, bag or the like. A multi-layer plastics film formed as seamless tube is made in a suitable manner into a casing, bag or the like, for example, after being cut to desired length. A flat plastics film is made into a proper form by the usual process.

The polyolefin resin layer to be contacted with the food to be packed may act as a heat sealant layer depending on the form of packaging material.

The laminated film of the invention can be produced in a suitable form such as flat forms, tubes and the like among which seamless tube is most preferred. Corona discharge treatment of a flat film is conducted in the conventional manner. Although the treating method is not specifically limited, a seamless tube is preferably subjected, as inflated with a gas, to corona discharge from outside of the tube to inside thereof according to the invention. This method can significantly increase the wet tension strength of innermost polyolefin resin layer surface in the tube. On the other hand, corona discharge treatment of uninflated film tube from outside thereof can not enhance the wet tension strength of polyolefin resin layer surface. For corona discharge treatment, the tube is inflated with a gas in an amount at least sufficient to prevent the contact of internal tube surface areas. In general, since the space between the internal tube surface areas kept gas-inflated substantially corresponds to the distance between the electrodes for corona discharge, a gas is forced into the tube in an amount sufficient to maintain the distance. Conventional devices for corona discharge can be used for the treatment of either a flat film or a tube film. The device for corona discharge treatment generally includes at least one discharge electrode and at least one counter electrode. For operation, the film to be treated is placed between the electrodes, then the distance between the electrodes is suitably adjusted by moving one of movably disposed electrodes and electricity is discharged from the discharge electrode to the counter electrode, causing a corona. The conditions for corona discharge are determined according to, e.g. the kind, thickness and feed rate of the film to be treated. The corona discharge treatment achieves remarkable improvement in the ability of the innermost polyolefin resin layer of treated film to achieve close contact with processed meat. Even if a film is so poor in this property as to be peeled from the processed meat without any resistance just after heat-shrink packaging, the property of the film can be improved by the corona discharge treatment according to the present invention at least in such degree that the film is peeled off the processed meat with slight resistance. The extent of improvement in this property attainable by the corona discharge treatment increases with a rise in the intensity of corona discharge treatment. The property can be easily improved according to the invention to such extent that peeling encounters considerable resistance, and even to such extent that peeling leaves the surface of food partly or nearly wholly adhered to the film. For use, a film with a suitable degree of this property is selected according to the kind of food to be packed. In packaging processed meat, a preferred film is one having such a degree of the property that peeling is executed at least with strong resistance or that peeling results at least in parts of processed meat holding fast to the film. It remains to be clarified why the corona discharge treatment improves the ability of the polyolefin resin layer to attain close contact with food to be packed. Presumably this is partly due to the increase in wet tension strength of polyolefin resin layer surface. Consequently it is suitable that although not specifically limitative, the conditions for corona discharge treatment be adjusted so that the corona discharge treatment provides the surface of polyolefin resin layer with a wet tension strength of at least about 35 dyne/cm, preferably at least about 37 dyne/cm, more preferably about 40 to about 50 dyne/cm.

The packaging material of the invention thus treated by corona discharge is outstanding in the property of attaining close contact wit processed meat. The film of the invention having enclosed therein processed meat retains this property after a time interval as well as on heat-shrink packaging, and thus can safely store the processed meat over a prolonged period of time without release of water.

According to a preferred embodiment of the packaging material of the invention, the polyolefin resin layer is treated with a blocking inhibitor at least at the surface thereof treated or to be treated by corona discharge. This treatment can effectively prevent blocking with substantially no reduction of the property of closely contacting with processed meat. For the treatment, the blocking inhibitor may be incorporated in the polyolefin resin layer to be treated by corona discharge or may be deposited on the surface of the resin layer treated or to be treated thereby. The blocking inhibitor can be deposited onto the polyolefin resin layer, for example, by applying a solution or dispersion of blocking inhibitor to the surface of polyolefin resin layer and drying the coated surface before corona discharge treatment, or by spreading the powder of blocking inhibitor over the surface of resin layer treated by corona discharge for deposition on the surface thereof. A suitable method of spreading a blocking inhibitor powder over a seamless tube of laminated film will be described later in detail with reference to the accompanying drawings. Useful blocking inhibitors are various and can be any of inhibitors which can inhibit blocking without causing health hazards in the food. Of these inhibitors, starch, corn starch or the like is preferred. The amount of the blocking inhibitor can be varied over a wide range and is not specifically limited. A suitable amount of the inhibitor to be present in the polyolefin resin is about 0.1 to about 4% by weight, preferably about 1.5 to about 3% by weight, based on the resin layer. On the other hand, a suitable amount of the inhibitor to be deposited by coating or spreading is about 0.3 to about 3.5 g, preferably about 0.5 to about 2.5 g, per square meter of the polyolefin resin layer, calculated as average deposition amount.

Figure 2:
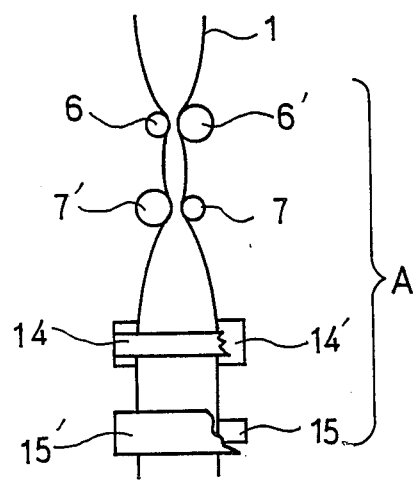

A process for preparing the packaging film material of the invention will be described below with reference to the accompanying drawings in which:

FIG. 1 is a schematic elevation view showing an example of the device for practicing the process of the invention; and FIG. 2 is a schematic elevation view showing 4 pairs of corona discharge means alone in another example of the device.

In FIG. 1, indicated at 1 is a heat-shrinkable, gas-barrier, multi-layer plastics film produced in the form of seamless tube by an inflation method in which the innermost layer is formed from a polyolefin resin (the lamination structure of the film 1 being not shown). A feed roll 2 for winding the film 1 thereon is rotatably supported on a base (not shown). A guide roll for the film 1 is designated 3. The tube of film 1 inflated with air or like gas is held air-tight between pairs of pinch rolls 4, 4' and 5, 5' and is kept fully inflated therebetween. Corona discharge is conducted from outside of the inflated tube of film 1 toward the inside thereof. A device A for corona discharge may be of the conventional type. The illustrated device A has two pairs of corona discharge means, upper and lower ones. The upper corona discharge means consists of a corona discharge electrode roller 6 and the opposed counter electrode roller 6' and the lower corona discharge means a corona discharge electrode roller 7 and the opposed counter electrode roller 7'. The roller 4, rollers 6, 6' and 7, 7' and intermediate nip rollers 8, 8' disposed downstream are driven by a motor (not shown) via a speed change gear (not shown), and the unillustrated motor also drives the pinch roller 5 through a speed reduction gear (not shown), whereby the film wound on the feed roll 2 is drawn out at a predetermined rate. The structure for corona discharge in the corona discharge electrode rollers 6, 7 known in the art is not shown. The distance between each pair of electrodes, i.e. discharge electrode rollers 6, 7 and counter electrode rollers 6', 7' respectively, is suitably controlled by moving one of the electrodes (discharge electrode or counter electrode) which is movably mounted. With the distance suitably set between the electrodes, the air present in the tube of film 1 serves to keep out of contact the opposed surface areas inside the tube at least during corona discharge. The contact of internal surface areas must be avoided in corona discharge treatment because the discharge effect is not produced over the surface of innermost layer if corona discharge is performed with the internal surface areas in contact. The corona discharge treatment is conducted in a direction from the discharge electrode rollers 6, 7 to the opposed counter electrode rollers 6', 7'. More specifically corona discharge is effected from outside of the tube film 1 to inside thereof by passing electricity from outside of the tube through inside thereof to outside thereof on the opposite side. The treatment imparts an increased wet tension strength to the surface of innermost polyolefin resin layer in the tube. When a single discharge electrode is used, the corona discharge treatment may produce an irregular effect due to the treatment only on one side. It is desirable therefore that at least two discharge electrodes as in the illustrated device be mounted against the opposed counter electrodes in symmetrical arrangement as if treatment were feasible from the left side as well as the right side, which is one preferred embodiment of the invention.

The intensity of corona discharge treatment is suitably variable with the kind and feed rate of the film, the thickness and the diameter of the tube and other factors. A wide range of treatment intensity is available but generally the intensity is adjusted to provide the surface of the innermost polyolefin resin layer with a wet tension strength of preferably at least 35 dyne/cm, more preferably at least about 37 dyne/cm, most preferably about 40 to about 50 dyne/cm.

The corona discharge treatment of the invention is not limited to the method of the device shown in FIG. 1 and can be variously practiced. For example, it is possible to further provide, as indicated in FIG. 2, discharge electrode rollers 14, 15 and opposed counter electrode rollers 14', 15' perpendicularly of the discharge electrode rollers 6, 7 and counter electrode rollers 6', 7'. With this embodiment, corona discharge treatment can proceed from the discharge electrode rollers 6, 7, 14, 15 to the counter electrode rollers 6', 7', 14', 15', namely is feasible at four sides. Alternatively, plasma treatment is possible using a device for plasma treatment in place of the device for corona discharge treatment.

The film tube 1 thus treated by corona discharge is narrowed by the intermediate nip rollers 8, 8' one of which is movable to adjust the distance between the rollers 8, 8' and then a blocking inhibitor is spread over the internal tube surface. The illustrated device is of the type capable of scattering the inhibitor by vibration. More specifically, two opposed idle rolls 9, 9 are disposed at a distance therebetween slightly smaller than the diameter of inflated tube. An applicator 10 for scattering the blocking inhibitor is loosely laid over the rolls 9, 9 within the tube. The applicator 10 has a size slightly smaller than the diameter of inflated tube but a little larger than the spacing between the rolls 9, 9 to avoid dropping through the passage between the rolls 9, 9. The rolls 9, 9 are covered with nonwoven fabric, flannel or like soft material to prevent the applicator 10 from damaging the innermost layer in the tube. The applicator 10 includes a quadrangular or cylindrical container packed with powdery blocking inhibitor and having a bottom with a net 11 of such mesh size that the blocking inhibitor can be scattered. The rolls 9, 9 are turned with the progress of tube feed while the applicator 10 is caused to make upward and downward quivers over the rolls 9, 9 due to actions including the turn of the rolls 9, 9, the force exerted in the direction of feeding the tube, the weight of the applicator and the like. In this way, the blocking inhibitor particles drop through the net 11 of the applicator 10 and spread over the internal tube surface. The blocking inhibitor particles thus scattered are deposited on the entire surface of the resin layer treated with corona discharge. The means for vibrating the applicator 10 can be of any suitable structure which can vibrate the applicator 10 to sprinkle the blocking inhibitor particles. Optionally the distribution may be done by a stirrer provided within the applicator 10 instead of the idle rolls or like vibrators. A bag or the like can be used as the applicator with, when required, a proper vibrator so that, for example, the inhibitor particles can be scattered through the small-size meshlike perforations of the bag. The film tube 1 thus with the blocking inhibitor distributed thereover is passed via the pinch rolls 5, 5' and a guide roll 13 and is wound on a take-up roll 12 being driven by the motor (not shown). Preferred examples of blocking inhibitors for distribution are starch or corn starch powders and the like. These inhibitors will not adversely affect the food, are therefore favorable from hygienic viewpoints, and can produce the effect of blocking inhibition without reducing the property of closely contacting with the food. Blocking inhibitor particles useful for scattering are those having a mean particle size which, although not specifically limited, ranges from about 5 to about 50 μm, preferably about 10 to about 20 μm. It is suitable to scatter the blocking inhibitor in an average deposition amount which is widely variable but preferably ranges from about 0.3 to about 3.5 g, preferably about 0.5 to about 2.5 g, per square meter of the internal tube surface.

In the embodiments described hereinbefore, air is preferably used for inflation of the tube. Also usable are other gases such as nitrogen gas, carbon dioxide gas, inert gas or the like which may increase the effect of corona discharge treatment. The direction of progress of tube feed is shown in the drawings as from upper to lower portions in the view, which is, however, not limitative. For example, the tube may be made to proceed from the lower to upper portions in such way that the distribution of blocking inhibitor as shown in FIG. 1 is conducted on the route. Another embodiment is possible in which the corona discharge treatment is performed in a tube being fed laterally of the view. There is no limitation on the direction of progress of tube feed and thus the desired arrangement can be freely designed to facilitate the application of blocking inhibitor and corona discharge treatment.

One example is given below to clarify the present invention in more detail.

EXAMPLE

A 3-layer film tube was produced by an inflation method involving co-extrusion through an annular die and using a copolymer of nylon 6 and nylon 6.6 for a base layer providing the outer surface of the film; a modified polyolefin resin for an intermediate adhesive layer, the resin containing a modified copolymer prepared by graft copolymerization of a linear low-density polyethylene with maleic anhydride; and a linear low-density polyethylene for an innermost layer. The 3-layer film tube thus molded by extrusion through the annular die in the inflation method was processed for biaxial orientation, giving a seamless tube of heat-shrinkable, gas-barrier, multi-layer film having a percent heat-shrinkage of about 20% as measured in vertical and lateral directions when subjected to a temperature of 80° C. (hot water) for 30 seconds. In this way, two kinds of specimens (Specimens No. 1 and No. 2) were prepared. Specimen No. 1 consisted of three layers each 20, 5 and 20 μm in thickness in the order of outer to inner layers and had a width of 160 mm when made flat. Specimen No. 2 was composed of three layers of 25, 5 and 25 μm thicknesses respectively as measured from the outer layer and a width of 100 mm in flat state.

The thus obtained film tube was subjected to corona discharge treatment by discharge of electricity from the discharge electrode rolls 6, 7 over the film being fed at a rate of 35 m/min with use of the corona discharge treatment device as shown in FIG. 1 to cause a corona. A spacing of 1.3 mm was set between the discharge electrode roller (covered with rubber and having a 420 mm length) and the counter electrode roller (made of metal and having a 420 mm length). The views of FIGS. 1 and 2 are depicted with disproportionate dimensions to facilitate visual comprehension. The corona discharge treatment was carried out over the tube fully inflated with air. For this treatment, the inflated tube was narrowed to about 1.3 mm spacing to produce a substantially flat state although short of contacted state. Subsequently, corn starch powder was scattered over and deposited onto the internal tube surface from a cylindrical container 10 (97 mm in diameter for Specimen No. 1 and 59 mm in diameter for Specimen No. 2) with a perforated bottom 11 by the device as illustrated in FIG. 1. For vibration of the container 10, the inflated tube was narrowed with idle rolls 9, 9 to a spacing smaller than the diameter of the container 10. The container 10 was placed over the idle rolls 9, 9 in the tube via the tube portion interposed therebetween, and was quivered vertically of the interior of the tube with the progress of tube feed and with the turn of the rolls 9, 9, whereby the corn starch powder was distributed in this favorable way.

The thus obtained multi-layer film tubes, Specimens Nos. 1 and 2, were each cut to 40 cm length to provide casings for processed meat. Ham and sausage were packed in deaeration into Specimens No. 1 and 2, respectively and hermetically sealed at both ends with a brass ring clip. The packaged products were heated at 80° C., for sterilization for 2 hours (or at 100° C. for 1 hour). After cooling, the packaged products were checked and found to have achieved close contact in desired degree between the internal tube surface and the processed meat. The processed meat was retained in satisfactorily packaged state because of heat shrinkage of the tube. Moreover, the tubes were fully openable in packing the processed meat and no blocking was detected.

Table 1 below shows the results.

The results obtained by packaging the processed meat with the specimens prepared according to the invention in this example are shown in Table 1 together with those acquired by using as a control a seamless film tube not subjected to corona discharge treatment nor to blocking inhibitor treatment.

TABLE 1

|  | Present Invention | | Control |
| --- | --- | --- | --- |
|  | No. 1 | No. 2 | No. 1 |
| Wet tension strength of internal tube surface (dyne/cm) (*1) | 42 | 41 | 31 |
| Degree of close contact with processed meat (*2) | A | A | E |
| Release of water (*3) | None | None | Gravy found |
| Openability (*4) | A | A | A |
| Preservability (*5) | Good | Good | Poor |

(*1) According to the method of testing polyethylene and polypropylene films for wet tension strength (JIS-K-6768)
(*2) The degree of attained close contact with the processed meat was checked by peeling the casing off the processed meat and was evaluated according to the following ratings.
A: The processed meat remained adhering to the casing when an attempt was made to peel the casing alone (the degree of attained close contact was most excellent).
B: The processed meat was left partly adhering to the casing when an attempt was made to peel the casing alone (the degree of attained close contact was excellent).
C: The casing alone was peeled off with considerable resistance (the degree of attained close contact was good).
D: The casing alone was peeled off with slight resistance (the degree of attained close contact was fair).
E: The casing alone was peeled off without any resistance (the degree of attained close contact was poor).
(*3) The release of water was evaluated by heating the packaged processed meat at 80° C. for sterilization for 2 hours and checking the cooled processed meat with unaided eye.
(*4) The openability was evaluated according to the following ratings.
A: Easily openable with fingers.
B: Blocking occurred.
(*5) The preservability was evaluated by rating the casing as good if no gap was formed between the casing and the processed meat and rating the casing as poor if it produced a gap.

The packaging material of the invention is outstanding in the property of attaining close contact with processed meat or like food and assures a long term storage of food without involving the release of water. The packaging material of the invention in which the surface of its innermost layer treated with corona discharge has been further treated with a blocking inhibitor is free of blocking with substantially no reduction of the property of closely contacting with the processed meat.

According to the process of the invention, the seamless tube of multi-layer plastics film for use as a food-packaging material can be subjected, as it is, to corona discharge treatment from outside to achieve the contemplated effect over the innermost layer, and corona discharge treatment can be conducted with great ease over the seamless film tube.

We claim:

1. A food-packaging material comprising a heat-shrinkable, gas-barrier, multi-layer plastic film laminate in the form of a seamless tube, wherein said laminate comprises (a) a base layer formed from polyamide resin, (b) an intermediate adhesive layer comprising at least one layer selected from the group consisting of a layer formed from modified polyolefin resin and a layer formed from ethylene-vinyl alcohol copolymer, and (c) an innermost, food-contacting layer formed from polyolefin resin, wherein the innermost, food-contacting surface of said layer of polyolefin resin has an increased wet tension strength obtained by subjecting the innermost, food-containing surfacing of said layer of polyolefin resin to corona discharge applied from at least one pair of positions outside the seamless tube while the seamless tube is in an inflated form, wherein the distance between two positions constituting each pair is approximately equal to the distance separating the opposed surface areas inside the inflated seamless tube at the point of corona discharge.

2. A food-packaging material according to claim 1 wherein the food-contacting surface of the polyolefin resin layer has a wet tension strength increased to a value of at least about 35 dyne/cm.

3. A food-packaging material according to claim 1 wherein the intermediate adhesive layer is a layer formed from modified polyolefin resin.

4. A food-packaging material according to claim 1 wherein the intermediate adhesive layer is a layer formed from ethylene-vinyl alcohol copolymer.

5. A food-packaging material according to claim 1 wherein the food to be packed is processed meat.

6. A food-packaging material according to claim 1 wherein the innermost polyolefin resin layer has a blocking inhibitor incorporated therein or deposited thereon.

7. A food-packaging material according to claim 6 wherein the blocking inhibitor is deposited in the form of powder on the surface of the resin layer.

8. A food-packaging material according to claim 6 wherein the blocking inhibitor is starch or corn starch.

9. A process for preparing a food-packaging material, comprising the steps of:
(1) inflating a heat-shrinkable, gas-barrier, multi-layer plastics film laminate in the form of a seamless tube, wherein said laminate comprises (a) a base layer formed from polyamide, (b) an intermediate adhesive layer comprising at least one layer selected from the group consisting of a layer formed from modified polyolefin resin and a layer formed from ethylene-vinyl alcohol copolymer; and (c) an innermost, food-contacting layer formed from polyolefin resin; and
(2) subjecting the inflated seamless tube to corona discharge from at least one pair of positions outside the seamless tube to increase the wet tension strength of the innermost, food-contacting surface of the polyolefin resin layer, wherein the distance between two positions constituting each pair is approximately equal to the distance separating the opposed surface areas inside the inflated seamless tube at the point of corona discharge.

10. A process for preparing a food-packaging material, comprising the steps of:
(1) inflating a heat-shrinkable, gas-barrier, multi-layer plastics film laminate in the form of a seamless tube, wherein said laminate comprises (a) a base layer formed from polyamide, (b) an intermediate adhesive layer comprising at least one layer selected from the group consisting of a layer formed from modified polyolefin resin and a layer formed from ethylene-vinyl alcohol copolymer; and (c) an innermost, food-containing layer formed from polyolefin resin;

(2) subjecting the inflated seamless tube to corona discharge from at least one pair of positions outside the seamless tube to increase the wet tension strength of the innermost, food-contacting surface of the polyolefin resin layer, wherein the distance between two positions constituting each pair is approximately equal to the distance separating the opposed surface area inside the inflated seamless tube at the point of corona discharge; and (3) spreading blocking inhibitor powder over the corona discharge-treated surface of the innermost polyolefin resin layer to deposit the powder thereon.

* * * * *

UNITED STATES PATENT AND TRADEMARK OFFICE
CERTIFICATE OF CORRECTION

PATENT NO. : 4,888,223

DATED : December 19, 1989

INVENTOR(S) : SUGIMOTO et al

It is certified that error appears in the above-identified patent and that said Letters Patent is hereby corrected as shown below:

On the cover page, after Item [76] add the following:

--[73] Assignees: Gunze Limited, Ayabe; Gunze Kobunshi Corporation, Isehara, both of Japan--.

Signed and Sealed this

Twenty-third Day of April, 1991

*Attest:*

HARRY F. MANBECK, JR.

*Attesting Officer*  *Commissioner of Patents and Trademarks*